Sept. 16, 1969     D. M. WILLIAMS     3,467,278

PLANTING METHOD AND APPARATUS

Filed June 22, 1966     2 Sheets-Sheet 1

DAVID M. WILLIAMS
INVENTOR.

KENDRICK, SUBKOW and STOLZY
BY

ATTORNEYS

United States Patent Office 3,467,278
Patented Sept. 16, 1969

3,467,278
PLANTING METHOD AND APPARATUS
David M. Williams, 165 Riker Terrace,
Salinas, Calif. 93901
Filed June 22, 1966, Ser. No. 559,562
Int. Cl. B67d 5/54, 5/52, 5/64
U.S. Cl. 222—1                         11 Claims

ABSTRACT OF THE DISCLOSURE

Seeds to be planted are gravity fed from a hopper to a substantially horizontal portion of an outlet tubing. At the appropriate time a blast of pressurized air ejects a measured amount of seeds into a furrow. Simultaneously, a store of vermiculite is gravity fed into a horizontal compartment in which it is also pneumatically ejected with the seeds to form a common mass in the furrow. Subsequently, the vermiculite-seed mass is sprayed with liquid fertilizer and then sprayed with an asphalt stabilizer. A further aspect is the provision of a plurality of such apparatus disposed transversely of the furrows with timed commutators provided planting locations of adjacent furrows in a staggered arrangement.

---

This invention relates to the field of agriculture, and more particularly to the art of planting crops.

The present invention will have many applications other than those disclosed herein. The invention should therefore not be limited to those so disclosed. However, the invention has been found to possess exceptional utility in the planting of a food crop and especially head lettuce, broccoli and the like.

In the past, it has been the practice to plant head lettuce seed in closely spaced relation all along a furrow in the earth. In such a case, it is also conventional to cover the seed with vermiculite to aerate, to facilitate germination and to prevent crust formation of the ground over a planted seed after a rain. This is disclosed in U.S. Patent No. 2,909,869.

The prior art method of planting is disadvantageous for several reasons. Seed is planted very close together in order to insure a full stand. However, this is expensive because both seed and vermiculite are expensive and an excessive use of either one is wasteful. Further, after a stand is established, the crop must be thinned out.

It is also a disadvantage of the prior art method that, in most cases, the thinning of the crop must be done by hand labor and this is both costly and time consuming.

If head lettuce were planted by hand, appropriate accurate spacing of heads could be maintained if some care were used in planting. However, it is not economical to plant by hand. That is, head lettuce must be machine planted. Further, if sufficient accuracy could be maintained in machine planting, any thinning could also be done by machine. Thinning is generally a necessity even if the best planting methods are used. The reason for thinning is that more than enough seed must be planted to insure a full stand. However, when several seeds are planted in one location, more than one plant frequently comes up.

Machine planting is difficult because a crosswind can blow seed off course as it is falling out of the machine onto the ground. Wind also often blows both seed and vermiculite completely outside of the furrow.

In order to overcome the wind problem in spreading other materials over the ground, it has been the practice to coat the materials with a stabilizer which is an asphalt emulsion in water. This is disclosed in U.S. Patent No. 2,844,914. However, such materials are blown through a fog or mist or the like. It is not possible to accurately control the direction in which these materials are blown because they are sticky.

There are also other disadvantages of planting machines of the prior art. For those which utilize seed dispensers including mechanical metering devices and moving parts near the ground, abrasion and wear become problems. Dirt also can cause maintenance problems.

In accordance with the present invention, the above-described and other disadvantages of the prior art are overcome by providing a machine which is operated to plant a few seeds at accurately spaced locations in a furrow.

It is also a feature of the present invention that vermiculite or other bulky organic or inorganic material may be dispensed in individual quantities over the seeds. Due to the periodic method and the accurate spacings which are maintained between seed locations, it is possible, in accordance with the present invention, to save considerable seed and vermiculite. For example, from two to five head lettuce seeds may be planted at one location. In a furrow, the seed locations may be spaced 12 inches apart.

Due to the fact that several seeds are planted at one location in accordance with the present invention, it is still possible for more than one head to grow in the same location. For this reason, the crop must be thinned.

It is a feature of the present invention that the machine thereof is accurately timed or synchronized to deposit one material on top of another. Thus, one machine may be employed to accomplish several functions. For example, in succession, seed may be deposited; vermiculite may be deposited on top of the seed; a liquid fertilizer may be deposited on top of the vermiculite; and a liquid stabilizer may be deposited on top of the fertilizer. All these steps may also be performed in succession and not simultaneously. However, it has been found that with no apparent disadvantage, the seed and vermiculite can be dispensed simultaneously. Further, the use of a machine to accomplish all of these functions is unusually efficient and accurate.

It is an outstanding feature of the present invention that a blast of a gas under pressure is employed, namely, air, to deposit the seed and vermiculite. Seed is therefore located in positions which are accurately spaced. Due to the fact that the blast of air carries the seed and vermiculite at a velocity much greater than that of any ambient wind, no crosswind can blow the seed off its course in falling out of the machine into a furrow.

As stated previously, it is possible to employ a stabilizer for the vermiculite and seed. It is in fact an outstanding feature of the present invention that the stabilizer is sprayed on top of the fertilized seed which has been covered with vermiculite. Unlike the prior art method of coating a material with a stabilizer before it is dispensed, the method of the present invention employs a successive step of depositing a stabilizer on the seed.

In accordance with another outstanding feature of the present invention, a vertical gravity feed is employed for seed and vermiculite dispensers. The only force needed, therefore, to operate these dispensers is compressed air and a solenoid valve to allow the air to escape. Due to this construction, the device of the present invention really has no mechanical metering device or moving parts near the ground. Abrasion and wear are therefore kept to a minimum. Further, dirt can cause no serious problem in the maintenance of the equipment because the moving parts in the solenoid valve are in effect self-cleaning because the escape of the compressed air keeps the solenoid valve clean.

The above-described and other advantages of the present invention will be better understood from the following description when considered in connection with the accompanying drawings.

3

In the drawings which are to be regarded as merely illustrative:

Figure 1:
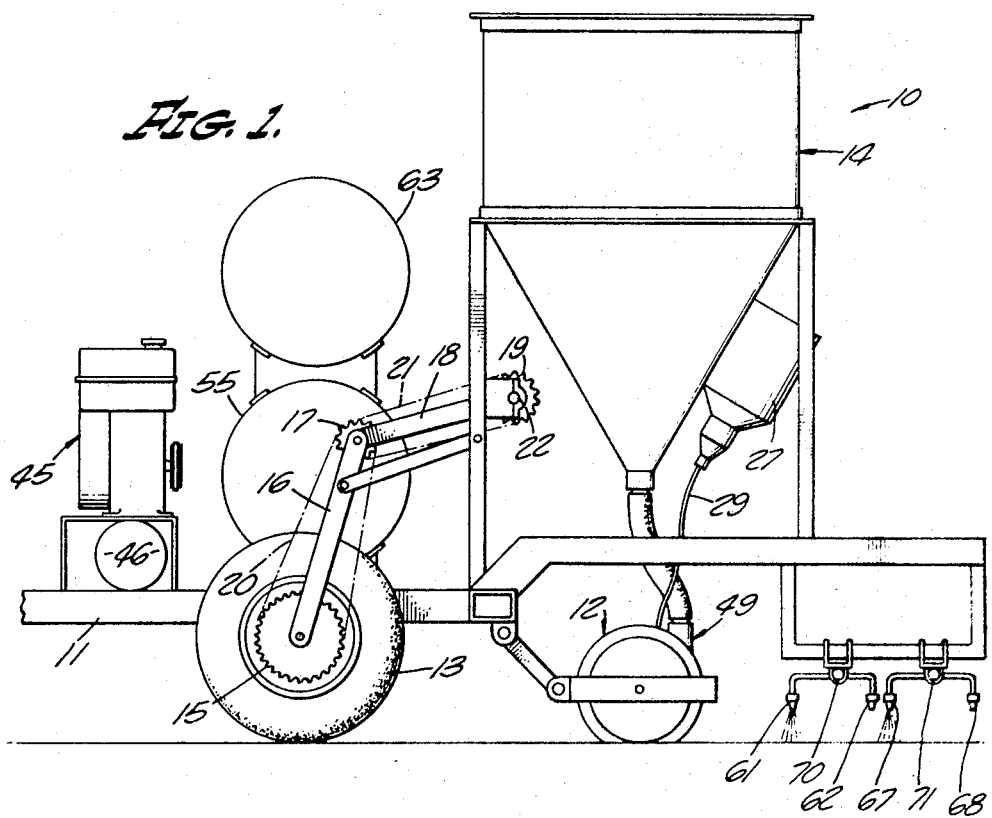
FIG. 1 is a side elevational view of a machine constructed in accordance with one embodiment of the present invention.

The machine of the present invention is indicated at 10 in FIG. 1. Machine 10 is carried on a chassis 11 which may be pulled as a trailer. A pair of disc openers 12 are mounted on chassis 11 for each seed dispenser.

Chassis 11 is supported on a pair of wheels 13, one of which is shown. Chassis 11 may also be supported upon two wheels, not shown, symmetrically below a vermiculite hopper 14 and in longitudinal alignment with wheels 13. An additional pair of wheels may also be employed at each end of hopper 14, if desired.

As shown in FIG. 1, wheel 13 has a sprocket 15 fixed thereto. A linkage 16 extends from the axis of sprocket 15 to the axis of a second sprocket 17. Similarly, a linkage 18 extends from the axis of sprocket 17 to the axis of a third sprocket 19. Sprocket 17 is a double sprocket and receives a chain 20 from around sprocket 15 and a chain 21 from around sprocket 19. Sprocket 19 is keyed to and drives a synchronizing shaft 22 as will be explained.

Figure 3:
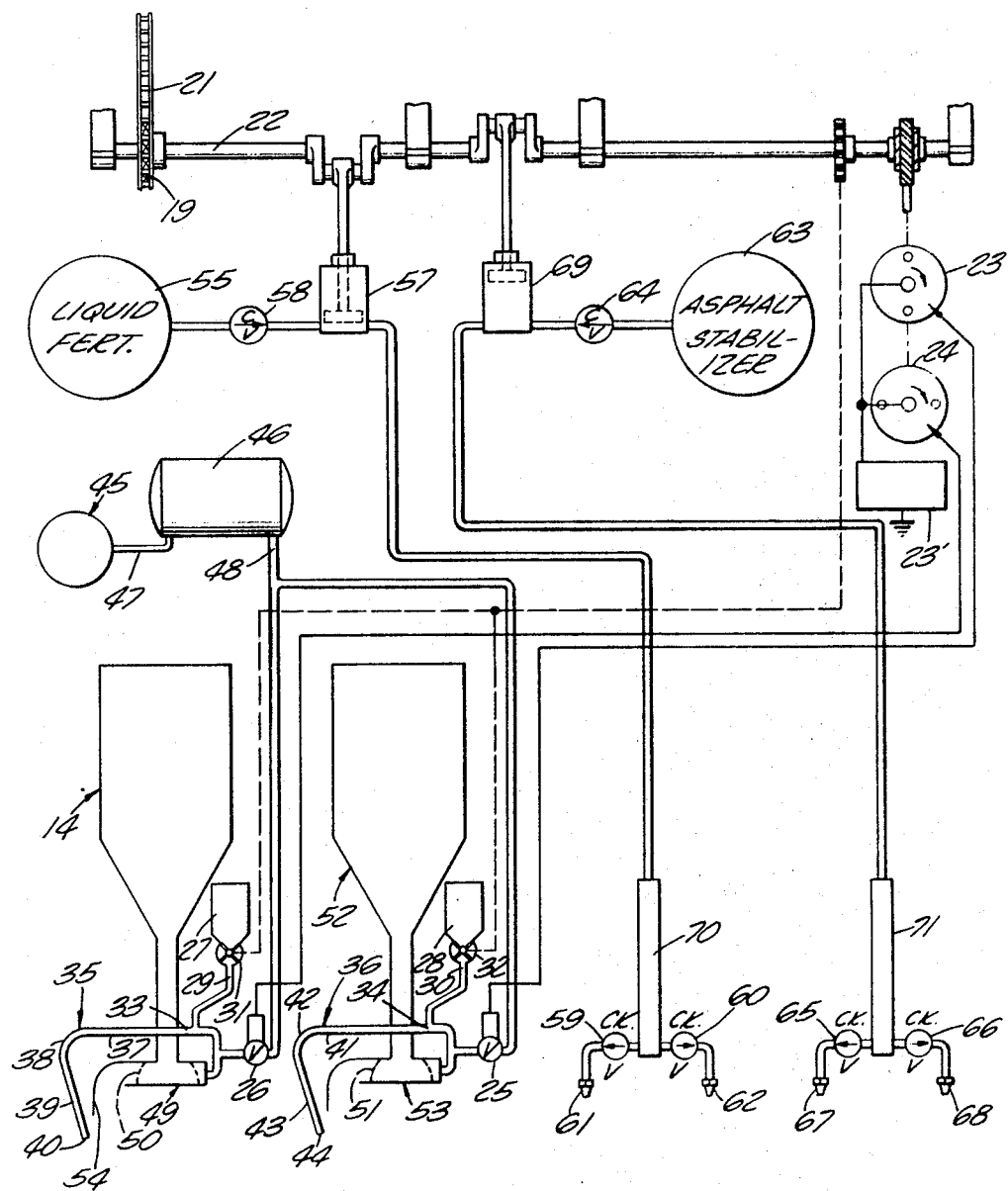
FIG. 3 is a schematic diagram of the machine shown in FIGS. 1 and 2.

Chain 21 and sprocket 19 with shaft 22 are shown in FIG. 3. Shaft 22 rotates a pair of commutators 23 and 24.

The machine 10 of the present invention is employed to plant head lettuce seed in eight adjacent furrows synchronously and at one time. However, structure for planting more than two furrows are identical to the other structures. For this reason, a structure for planting only two adjacent furrows are disclosed in detail.

In particular, commutators 23 and 24 are employed to energize two different sets of solenoid valves so as to plant seed in one furrow six inches longitudinally spaced from seed planted in an adjacent furrow. For example, commutator 23 operates solenoid valve 25. Commutator 24 operates solenoid valve 26.

As shown in FIGS. 1 and 3, seed is retained in a seed hopper 27. Two such seed hoppers 27 and 28 are shown in FIG. 3. A few seed are dropped down vertical gravity feed tubes 29 and 30 by two corresponding brush type distributors 31 and 32 which are conventionally geared to shaft 22. Commutators 23 and 24 are also conventionally geared to shaft 22. Commutators 23 and 24 are connected from an electrical source of potential 23'.

As stated previously, a few head lettuce seed are deposited in locations located one foot apart in a furrow. Thus, in the travel of the machine 10 one linear foot forward, ample opportunity is provided for distributors 31 and 32 to drop a few head lettuce seed to horizontal surfaces 33 and 34 in tubes 35 and 36, respectively. Tube 35 has a horizontal portion 37, a bend at 38, a downwardly and rearwardly extending portion 39, and an opening 40. Tube 36 has portions 41, 42, 43 and 44 identical to portions 38, 39 and 40, respectively, of tube 35.

When machine 10 arrives at a location in which seed should be planted, solenoid valve 26 is normally closed However, in that position, commutator 24 energizes solenoid valve 26 and allows a blast of air to be expelled through tube 35. This blows the seed from surface 33 out of opening 40 into a furrow. The air is supplied by a compressor 45 which is connected to a tank 46 at 47. Tank 46 is in turn connected to valves 25 and 26 through a pipe 48.

Vermiculite is dispensed at the same time that seed is dispensed. A dispenser 49 is provided for the vermiculite. However, no means are provided to meter the vermiculite into dispenser 49 if distributors 31 and 32 are provided for the seed. On the contrary, vermiculite hopper 14 is simply filled to the top and, before it is expelled, occupies the space below the lower end of hopper 14 as indicated at 50 and 51. Alternatively, individual vermiculite hoppers may be provided as indicated at 52 for vermiculite dispenser 53.

When valve 26 is energized, a blast of air is likewise introduced into the dispenser 49. This blows a metered quantity of vermiculite against a deflector 54 and down on the ground covering the seed dispensed from tube 35.

Seed and vermiculite are dispensed in an identical manner through the use of valve 25, except that commutator 23 operates valve 25 at times midway between the operation of solenoid valve 26.

As shown in FIG. 3, liquid fertilizer is dispensed from a tank 55. A piston type positive displacement pump 57 draws the fertilizer from tank 55 through a check valve 58. At the same time, check valves 59 and 60 at nozzles 61 and 62 close. Pump 57 then fills. The fertilizer in pump 57 is forced through check valves 59 and 60 and through nozzles 61 and 62.

Note will be taken that on the chassis 11 of the machine 10, tubes 35 and 36 are not in longitudinal alignment. They are in transverse alignment. The same is true of dispensers 49 and 53.

Similarly, none of the nozzles 61 is in longitudinal alignment with nozzles 62. The reason for this will be apparent hereinafter.

A stabilizer which is an asphalt emulsion in water is dispensed from a tank 63 through check valves 64, 65, and 66, and nozzles 67 and 68. A positive displacement pump 69 identical to pump 57 is employed for this purpose. Pumps 57 and 69 are conventional.

As before, nozzles 67 are not in longitudinal alignment with nozzle 68. Nozzles 67 are employed for one set of furrows. Nozzles 68 are employed for furrows alternate to those for which nozzles 67 are employed. Similarly nozzles 62 are employed for furrows which are alternate for those which nozzles 61 are employed. The forward and rear spacing of nozzles 61 and 62 and nozzles 67 and 68 are employed to dispense fertilizer and stabilizer on the same spots in adjacent rows. However, since seed is planted in one furrow midway between where it is planted in an adjacent furrow, and due to the fact that pump 57 dispenses fertilizer from both nozzles 61 and 62 at the same time nozzles 61 and 62 must be spaced longitudinally apart. The same is true of nozzles 67 and 68.

As shown in FIG. 1, nozzles 61 and 62 are fed by a header 70. Nozzles 67 and 68 are fed by a header 71.

As stated previously, the use of a stabilizer is made to prevent seed and vermiculite from blowing away. Both seed and vermiculite may, in fact, be blown completely out of a furrow in which they are dispensed simply by ambient wind.

In general, the stabilizer should dry to a light cake which can act as a binder to the seed and vermiculite particles. However, the binder cake should not be so firm that it will not eventually break up. None of these stabilizer requirements are critical, and any conventional mulch, such as asphalt or any caking or other binder, may be employed for the stabilizer of the present invention.

From the foregoing, it will be appreciated that the method of the present invention including the steps of planting a few head lettuce seeds in accurately spaced locations, is unusually advantageous for several reasons. In the first place, only a few seeds are planted in spaced locations. This saves both seed and vermiculite. Further, any place where more than one head of lettuce grows can be trimmed from the crop. In particular, the crop may be thinned with a minimum amount of hand labor which is a saving both in expense and time. Because of the regular intervals of planting, and the high percentage of plants separate from others, the labor-requirements for hand thinning is greatly reduced.

In accordance with an outstanding feature of the present invention, a few head lettuce seed are planted accurately in spaced locations, and the seed are planted by a machine. The accuracy of the planting and the entire mechanization of the operation makes it less expensive and makes it possible to plant at a reasonable rate of speed.

Figure 2:
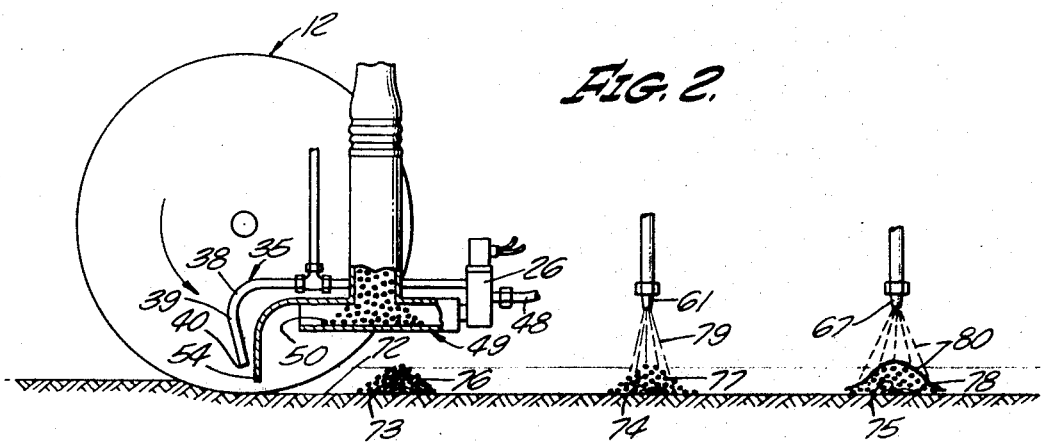
FIG. 2 is a transverse sectional view of a portion of the machine shown in FIG. 1.

It is also an outstanding feature of the present invention that compressed air in tank 46 is employed to dispense seed from tubes 35 and 36, and to expel vermiculite from dispensers 49 and 53. This accurately places the seed and in vermiculite in the furrow indicated at 72 in FIG. 2, where they ought to be. An ambient crosswind therefore cannot blow the seed and vermiculite off course as the seed and vermiculite fall or are blown out of tubes 35 and 36 and dispensers 49 and 53.

After the seeds 73, 74 and 75 have been deposited in furrow 72 and vermiculite 76, 77 and 78 has been deposited on top of seeds 73, 74 and 75, liquid fertilizer at 79 is sprayed on top of the vermiculite and stabilizer 80 is sprayed on top of the fertilizer 79. Stabilizer 80 therefore keeps the vermiculite and seed from being blown out of furrow 72.

Further, by applying stabilizer 80 to the fertilized seed and vermiculite, both seed and vermiculite may be moved out of tubes 35 and 36 and leave dispensers 49 and 53 dry. Thus, they may be moved quickly and accurately by the use of compressed air to their particular locations. In this regard, it is somewhat striking that the same valve 26 may be employed to use air both to expel seed and vermiculite and that the seed will become effectively buried in or buried beneath the vermiculite even though both are dispensed approximately at the same time in accordance with the present invention.

Due to the fact that no mechanical metering devices are used near the ground, and that there are no considerable moving parts near the ground, abrasion and wear do not become problems. Further, dirt is not a maintenance problem. One of the reasons for this is that valve 26, by controlling compressed air, in effect is self-cleaning.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In a machine movable over the ground on wheels for planting seeds, a mechanism for moving material from within the machine out onto the ground, said mechanism comprising: a hollow, inverted T-shaped dispenser having a vertical leg and a horizontal arm; means to drop a measured quantity of material through said leg onto the internal surface of said arm, said arm being open at one end; and automatically operable means operatively associated with said dispenser for introducing a pulselike blast of a gas under pressure into the other end of said arm to expel said material as a unitary mass from said arm through said one end and to deposit it on the ground.

2. The invention as defined in claim 1, wherein said dispenser has a deflector fixed to the top of the open end of said arm in a position to extend outwardly and downwardly therefrom.

3. The invention as defined in claim 1, wherein said one end of said arm is tube shaped and extends outwardly and downwardly toward the ground.

4. In a machine movable over the ground on wheels for planting seeds, a mechanism for moving a measured amount of material from within the machine out onto the ground, said mechanism comprising: a hopper for the material; a hollow, inverted T-shaped dispenser having a vertical leg and a horizontal arm; a vertical tube-like member connecting the bottom of said hopper to the top of said leg, said arm being open at one end; and automatically operable means operatively associated with said dispenser for introducing a pulselike blast of a gas under pressure into the other end of said arm to expel the measured quantity of said material from said arm in a substantially unitary mass through said one end and to deposit it on the ground.

5. Planting apparatus comprising: a machine having a chassis and a set of wheels thereon; a seed dispenser on said chassis; means on said chassis operable synchronously with rotation of said wheels for intermittently expelling a quantity of seed from said seed dispenser at a selected position; a vermiculite dispenser on said chassis; means on said chassis operable synchronously with rotation of said wheels for intermittently expelling a quantity of vermiculite from said vermiculite dispenser substantially at said selected position; a liquid fertilizer dispenser having a downwardly directed nozzle on said machine spaced a first distance rearward of said predetermined position in longitudinal alignment with said seed and vermiculite dispensers; means on said chassis operable synchronously with rotation of said wheels for intermittently expelling a quantity of said fertilizer from said first nozzle, said first distance having a correlation to said synchronization such that said first nozzle is vertically aligned with a quantity of dispensed seed and vermiculite each time said fertilizer is dispensed; an asphalt stabilizer dispenser having a downwardly directed second nozzle on said machine spaced a second distance rearward of said first nozzle in longitudinal alignment with said seed, vermiculite and liquid fertilizer dispensers; and means on said chassis operable synchronously with rotation of said wheels for intermittently expelling a quantity of said stabilizer from said second nozzle, said second distance having a correlation to said synchronization such that said second nozzle is vertically aligned with a quantity of dispensed and fertilized seed and vermiculite each time said stabilizer is dispensed.

6. A planting machine comprising: a chassis; a set of wheels to support said chassis on the ground; a material dispenser on said chassis, said dispenser including a material storage chamber and a material discharge chamber communicating with said storage chamber and being adapted to receive material therefrom; a tank of compressed air on said chassis; a connection fixed between said tank and said material discharge chamber; a valve in said connection; a solenoid winding fixed to said valve to open said valve when energized; an electrical source of potential; and switch means actuable synchronously with rotation of said wheels to energize said winding intermittently with said source of potential.

7. The method of moving a granular material out of a machine onto the ground, said method comprising the steps of: automatically and intermittently dropping a specific discrete quantity of material onto the internal surface of a horizontal tube-like body open and downwardly extending at one end; and automatically and intermittently injecting a pulse of gas under pressure into the other end of said body to blow said quantity of material out onto the ground.

8. The method of moving a granular material out of a machine onto the ground, said method comprising the steps of: filling a vertical gravity feed line with a granular material, said feed line terminating at its lower end in a horizontal tube-like body open at one end, said open end having a downwardly directed deflector whereby gravity fed granular material stores into the horizontal body in a measured amount; and automatically and intermittently injecting a gas pulse under pressure into the other end of said body to blow a metered quantity of said material out onto the ground.

9. The method of moving a granular material out of a machine onto the ground, said method comprising the steps of: metering out a quantity of seed; dropping said metered quantity of seed down through a vertical gravity feed line onto the internal surface of a horizontal portion of a tube-like body, said body having a bend at one end and a downwardly extending portion open at its lower end; and automatically and intermittently pulsing air under pressure into the other end of said body to blow said metered quantity of seed out onto the ground.

10. In a machine movable over the ground on wheels for planting seeds, a mechanism for moving material from within the machine out onto the ground, said mechanism comprising: a hollow, inverted T-shaped dispenser having a vertical leg and a horizontal arm; means to drop said material through said leg onto the internal surface of said arm, said arm being open at one end; and exhaust means to introduce a blast of a gas under pressure into the other end of said arm to expel a quantity of said material from said arm through said one end and to deposit it on the ground; said exhaust means including an air compressor, an air storage tank, a solenoid valve connected from said tank to introduce air into said other end of said dispenser arm, and means responsive to rotation of said wheels for opening said valve momentarily.

11. In a planting machine including a chassis and wheels connected thereto for moving the chassis over the ground, the combination comprising: a pair of material dispensers longitudinally and transversely spaced from one another, and common pump means communicating with each of said dispensers and operatively connected to said machine wheels for intermittently and substantially simultaneously dispensing material in adjacent rows at staggered positions as the machine moves along the ground.

References Cited

UNITED STATES PATENTS

| | | | |
|---|---|---|---|
| 886,979 | 5/1908 | Holt | 222—193 |
| 2,682,132 | 6/1954 | Marihart | 111—73 X |
| 3,060,873 | 10/1962 | Powers | 111—73 |
| 3,343,507 | 9/1967 | Smith | 111—73 |
| 1,638,048 | 8/1927 | Matheson | 222—194 |
| 2,538,756 | 1/1951 | Braswell | 222—193 |
| 3,082,007 | 3/1963 | Johnson | 222—193 X |
| 3,129,852 | 4/1964 | Mower | 222—193 X |
| 2,770,912 | 11/1956 | Deem | 222—193 |
| 3,133,676 | 5/1964 | Haun | 222—194 |

ROBERT B. REEVES, Primary Examiner

H. S. LANE, Assistant Examiner

U.S. Cl. X.R.

111—37; 222—135, 178, 193